Nov. 28, 1944.  S. B. MARTIN  2,363,889

PUSHER

Filed April 26, 1941  3 Sheets-Sheet 1

INVENTOR.
STODDARD B. MARTIN
BY Richey & Watts
ATTORNEYS.

Nov. 28, 1944. S. B. MARTIN 2,363,889
PUSHER
Filed April 26, 1941 3 Sheets-Sheet 3

INVENTOR.
STODDARD B. MARTIN
BY Richey & Watts
ATTORNEYS

Patented Nov. 28, 1944

2,363,889

UNITED STATES PATENT OFFICE 2,363,889

PUSHER

Stoddard B. Martin, Lakewood, Ohio

Application April 26, 1941, Serial No. 390,601

22 Claims. (Cl. 29—61)

This invention relates to stock pushers for automatic screw machines.

Each spindle of an automatic screw machine ordinarily includes a rotating collet tube having a collet at its forward end which is arranged to be compressed radially to grip and rotate a bar of stock fed axially through the collet tube. At the end of each cycle of operations of the machine, the projecting end of stock is cut off from the bar, the collet opens, a new length of stock is fed forwardly, and the collet is again closed to grip the stock and repeat the cycle of operations. The stock is ordinarily fed forward by a pusher carried by a reciprocating pusher tube arranged between and co-axial with the collet tube and the stock.

In the conventional machine the pusher is simply a spring bushing, exerting a constant grip on the bar, which is moved forwardly after the collet opens until the forward end of the bar strikes a stock gauge. The collet then closes and the pusher is retracted while the bar is gripped by the collet. One of the disadvantages of this arrangement is that when the pusher is given a sufficiently tight grip on the bar to insure accurate feeding and prevent rebounding when the bar strikes the gauge, there is danger of scratching and scoring the stock when the pusher is retracted.

To avoid this disadvantage, it has been proposed to provide one-way grippers which by a wedging or similar action grip the bar tightly on the forward feeding stroke, and release it, or grip it but lightly, on the return stroke. It is however, occasionally necessary to withdraw a bar from the machine, and to permit this, means must be provided to prevent the wedging action or tight gripping of the bar when desired.

It has also been proposed to construct such pushers as master pushers. The gripping surfaces that engage the stock are provided by a bushing removable from the pusher shell, so that a bushing with the desired sized opening may be positioned in the shell of the pusher to accommodate any particular size of stock without substituting an entire pusher or feeding finger as has been customary in conventional machines. One of the outstanding disadvantages of such master pushers which have heretofore been used is that the pushers have only been capable of receiving stock somewhat smaller than the maximum capacity of the machine, because the wedging means, bushings and the like occupy a certain amount of space which must be subtracted from the space in the pusher otherwise available for stock. Accordingly in such devices it has been necessary, when it is desired to operate upon stock of the maximum capacity of the machine, to replace the master pusher with the conventional spring type pusher. In addition it has been necessary heretofore to remove the entire pusher tube from the machine in order to change the bushing to receive a different size stock so that little, if any, time is saved by the use of the master pusher.

Pushers provided with one way grippers to increase the grip on the stock during the feeding stroke and in which the gripping elements are replaceable so that they may be operated as master pushers are disclosed and claimed in my prior Patents Nos. 2,088,067, 2,169,108, 2,187,089, and 2,187,090. The present invention relates to improvements in this general type of pusher.

The principal object of this invention is to arrange the parts of a master pusher so that it is capable of handling stock of a diameter up to and including the maximum capacity of the machine. Other objects are to incorporate wedging surfaces between the shell and bushing of a pusher within the radial dimensions of the walls of the shell and bushing; to utilize a part of the wall of the shell to exert a stock gripping pressure upon the yieldable bushing; to utilize this portion of the wall of the shell as an abutment engaging a cooperating surface on the bushing to move the bushing on the rearward stroke of the pusher; to provide an improved and simplified means for holding the wedging surfaces out of engagement, when desired, to permit withdrawal of a bar of stock; to hold the bushing in place in the shell by means releasable from the forward face of the pusher so that the bushing may be removed and replaced from the front face of the collet; to prevent the cooperating portions of the bushing and shell from escaping from their proper relation when the bushing collapses to its minimum diameter when the stock is removed therefrom; and generally to simplify, reduce the cost, and improve the efficiency of pushers of this type.

In the accompanying drawings which illustrate preferred embodiments of the invention.

Referring to the drawings, the embodiment of my invention illustrated in Figures 1 to 10 comprises broadly a shell 1 and a bushing 2. The shell 1 is threaded at its rearward end as indicated at 3 and fastened to the forward end of a pusher tube 4. In use in a machine the pusher tube is inserted within the collet tube 5 which carries at its forward end a collet 6 and which in turn is disposed within the spindle tube 7. As illustrated the collet 6 is a master collet of the type described and claimed in my copending application Serial No. 305,295, filed November 20, 1939, in which the stock gripping surfaces are provided with removable pads 8. The stock is fed against the stock gauge G by the pusher tube 4, the stock gripping surfaces provided by the pads 8 being open during the forward stroke of the pusher. After the pusher has completed its forward stroke the collet tube 5 is drawn rearwardly so that the cooperating wedging surfaces 9 on the outer surface of the collet and the inner surfaces of the spindle 7 collapse the collet and cause the pads 8 to grip tightly the bar of stock. The spindle is ordinarily rotated in a clockwise direction as seen from the rear end or the left-hand end in Figure 1. This rotation is imparted through the collet to the stock during the various operations performed by the machine upon the stock S. The pusher tube is normally mounted in the machine for free rotation. Thus the rotation of the stock is imparted to the portion of the pusher which grips the stock and thence to the entire pusher tube.

Figure 1:
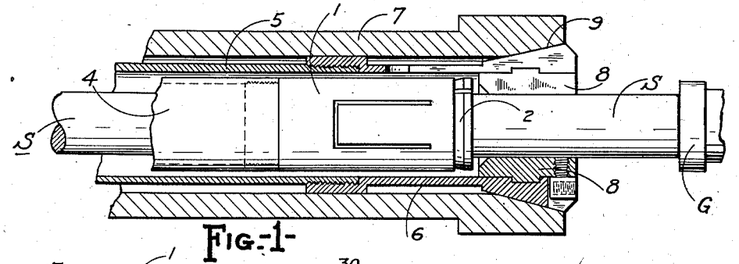
Figure 1 is a longitudinal section through the spindle and collet tube of an automatic screw machine showing a pusher constructed in accordance with this invention at the end of its forward or feeding stroke.
Figures 2, 3, 4, 5, 6:
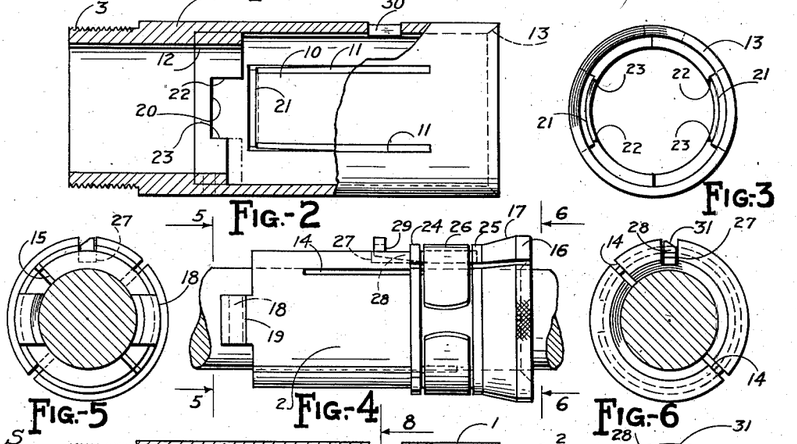
Figure 2 is a view partly in section and partly in elevation of the shell of a pusher such as illustrated in Figure 1.
Figure 3 is an end view of the shell shown in Figure 2.
Figure 4 is an elevation of a bushing forming a part of the pusher illustrated in Figure 1.
Figure 5 is an end view of the bushing shown in Figure 4 looking in the direction of the arrows 5—5 of Figure 4.
Figure 6 is a view of the opposite end looking in the direction of the arrows 6—6 of Figure 4.
Figures 7, 8:
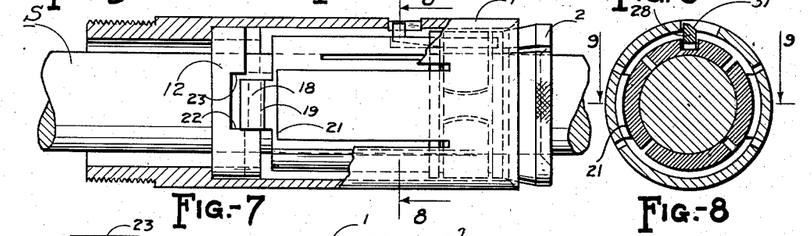
Figure 7 is a view of the assembled pusher showing the shell partly in section and partly in elevation and the bushing in elevation with the wedging surfaces exerting a tight grip upon the stock.
Figure 8 is a section taken on the plane indicated by the line 8—8 of Figure 7 looking in the direction of the arrows.
Figure 9:
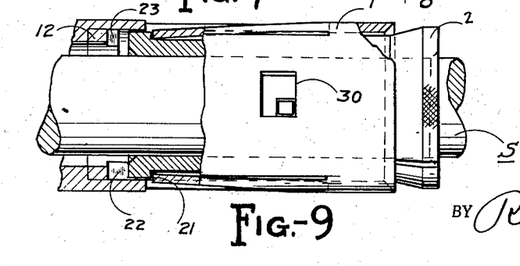
Figure 9 is a view of the assembled pusher partly in elevation and partly in section, the section being taken substantially on the line 9—9 of Figure 8.
Figure 10:
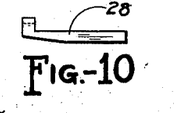
Figure 10 is a detailed view of a locking key carried by the bushing.

In this embodiment of my invention the shell 1 is provided on opposite sides with prongs 10 formed by U-shaped cuts 11 through the shell which prongs are pressed inwardly before hardening so as to provide inwardly directed springs. The ends 21 of the prongs 10 are preferably bevelled as shown. The shell is also provided interiorly with a collar 12 having its forward face formed with abutment surfaces at different levels for cooperation with the bushing. The forward end of the shell 1 is preferably bevelled as indicated at 13.

The bushing 2 illustrated in Figure 4 is formed as a one piece sleeve having slots 14 cut into the sleeve from the front end and slots 15 cut into the sleeve from the rear end, each slot extending through more than one-half the length of the bushing 2 so as to provide a one piece resiliently contractible member. At its forward end the bushing is provided with a thickened portion 16 the outer surface of which is bevelled at a small angle as indicated at 17. The thickened portion 16 may be knurled as illustrated to facilitate handling. At its rear end the bushing is provided on opposite sides with rearwardly extending lugs 18 which have external forwardly facing abutment shoulders 19 raised beyond the outer diameter of the main body of the bushing 2. Preferably these abutment shoulders 19 are slightly undercut to receive the bevelled ends 21 of the prongs 10 and prevent the prongs from slipping off the shoulders.

The sleeve 12 in the shell 1 is formed with recesses 20 to receive the lugs 18. When the lugs 18 are positioned in the recesses 20 the shoulders 19 on the lugs are positioned in alignment with the rear ends 21 of the prongs 10, so that the bushing 2 is prevented from escaping forwardly out of the shell by engagement of the prongs against the shoulders 19.

On one side of each of the recesses 20 the sleeve 12 is provided with a lateral abutment 22 to engage the side of the cooperating lug 18. These abutments 22 are of sufficient length to prevent the lugs 18 from escaping between the sleeve 12 and the prongs 10 when the bushing is rotated in a direction to turn the lugs against the abutments 22. On their opposite sides the recesses are provided with shorter abutments 23, which are so positioned with respect to the ends 21 of the prongs 10 as to permit the lugs 18 to be moved between the prongs 10 and the abutments 23 when the bushing 2 is rotated in that direction. In the usual machine the spindle is rotated in a clockwise direction as viewed from the rear end of the pusher tube and in such machines the abutment surfaces 22 are arranged as shown to engage the lugs 18 when the bushing is rotated in its normal clockwise direction with respect to the shell.

The tapered surface 17 at the forward end of the bushing is arranged to cooperate with the bevelled surface 13 at the end of the shell 1 so that when the lugs 18 are positioned in the recesses 20, and the shell tends to move forwardly with respect to the bushing the outer end of the shell wedges the forward end of the bushing inwardly and grips the stock S tightly. When the shell 1 is retracted or moved rearwardly the wedging grip is released, so that the bushing has only a spring grip on the stock and can be readily slid rearwardly thereover without scratching or scoring the same.

When it is desired to withdraw the bar from the pusher arrangement just described it is only necessary to grasp the rear end of the bar, push it forwardly until the shoulders 19 are in full engagement with the ends 21 of the prongs 10, and rotate the bar in a counterclockwise direction so as to bring the rear ends of the lugs 18 in alignment with the abutments 23. In this position the shell can be withdrawn without causing engagement of the tapered surface 17 in the bevelled surface 13 of the shell, so that it is only necessary to overcome the friction of the spring grip of the bushing on the bar. Likewise by grasping the enlargement 16 at the forward end of the bushing, the bushing can be further rotated in the same direction until the shoulders 19 of the lugs 18 move entirely past the ends 21 of the prongs 10, at which time the bushing can be withdrawn forwardly out of the shell. The bushing can be removed in this way when the pusher tube is removed from the machine; or, when it is desired to change sizes without removing the pusher tube, the pads 8 can be removed from the collet, the bushing removed from the front face of the collet, and the new bushing installed, after which the proper sized pads 8 can be secured in the collet and the machine is again ready for operation.

With the arrangement described the spring grip of the bushing on the stock S is obtained by the inherent resiliency of the one piece bushing and the spring pressure of the prongs 10 against the bushing. Further spring pressure can be provided if desired and likewise, when desired, the bushing may be provided with means to normally limit its rotation with respect to the shell. In the embodiment illustrated in Figures 1 to 10 both of these results are accomplished by providing the bushing with spaced ribs 24 and 25 between which is located an annular spring 26. A slot 27 is milled into the bushing at one point and a key 28 is rockably mounted in the slot. One end of the key 28 is positioned under the spring 27 and the other end projects radially outward from the bushing and is formed with a head 29 to cooperate with suitable abutment surfaces on the shell.

As illustrated the shell is formed with a rectangular cutout 30 to receive the head 29 of the key 28. The cutout 30 is formed of sufficient axial length to permit the axial movement of the bushing 2 within the shell which is necessary for engaging and disengaging the tapered surface 17 and the bevelled surface 13. On one side the head 29 of the key 28 is bevelled as illustrated at 31, so that the key may be forced past one edge of the cutout 30 by exerting sufficient turning force on the bushing to depress the head end of the key in the slot 27 against the tension of the spring 26. This bevelled surface 31 is arranged to engage the side edge of the cutout 30 to yieldably limit rotation of the bushing in a counterclockwise direction as viewed from the rear end of the pusher. The cutout 30 is of sufficient circumferential extent to permit the bushing to be rotated to seat the lugs 18 upon the abutments 23 before the bevelled surface 31 contacts the edge of the cutout. Thus when it is desired to withdraw a bar from the machine it is only necessary to rotate the bar until the bevelled surface 31 of the key strikes the lateral edge of the cutout 30, which creates additional resistance to rotation. At this time the bar can be withdrawn and a new bar inserted without danger of the bushing escaping from its proper position in the shell. When, however, it is desired to remove the bushing from the shell, it is only necessary to grasp the forward enlarged end 16 of the bushing and further rotate the bushing with sufficient force to depress the head end 29 of the key 28, after which the bushing can be further rotated and withdrawn from the shell as previously described.

It will be understood the embodiment illustrated in Figures 1 to 10 may be used without the key 28 when desired, since in normal operation the bushing is held against rotation with respect to the shell by the engagement of the lugs 18 with the abutments 22. With this arrangement the bar can be withdrawn, without freeing the bushing from the shell, by turning the bushing counter to its direction of rotation only a short distance, and the bushing can be removed by turning it farther in the same direction.

In Figures 11 to 20, inclusive, I have illustrated a modified form of the pusher. In this form the pusher embodies a shell 41 and a bushing 42. The shell 41 is threaded at its rearward end as indicated at 43 to permit its attachment to the forward end of the pusher tube.

Figure 11:
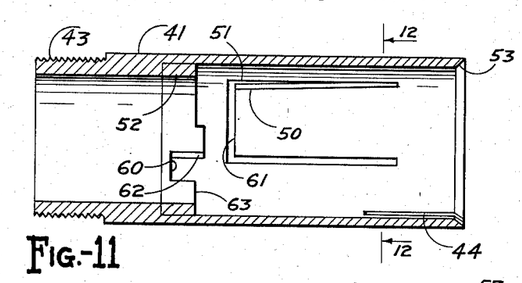
Figure 11 is a longitudinal section through the shell of a modified form of pusher.
Figure 12:
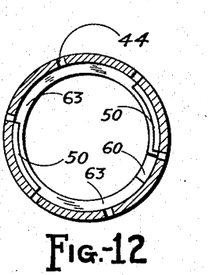
Figure 12 is a cross-section taken on the line 12—12 of Figure 11.

Instead of being solid, as in the embodiment previously described, the shell 41 is split by means of slots 44 extending inwardly from the front face. The number and depth of these slots may be varied as desired to give the forward end of the shell a certain degree of stiffness while permitting it to yield in the event of an overload.

As in the previous embodiment the shell is provided on opposite sides with prongs 50 formed by U-shaped cuts 51. The shell is also provided interiorly with a collar 52 which has its forward face formed with abutting surfaces for cooperation with the bushing. The open end of the shell is preferably bevelled as indicated at 53.

Figure 13:
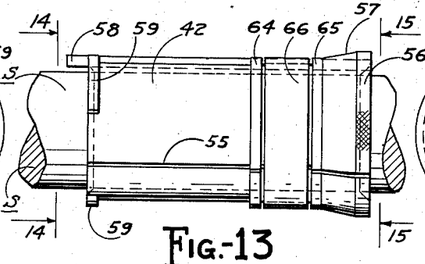
Figure 13 is an elevation of a bushing for cooperation with the shell shown in Figure 11.
Figure 14:
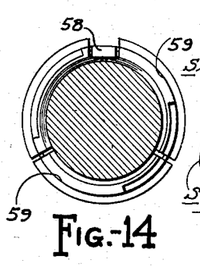
Figure 14 is an end view of the bushing shown in Figure 13 looking in the direction of the arrows 14—14 on Figure 13.
Figure 15:
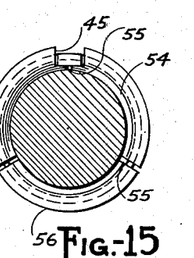
Figure 15 is a view of the opposite end looking in the direction of the arrows 15—15 on Figure 13.
Figure 16:
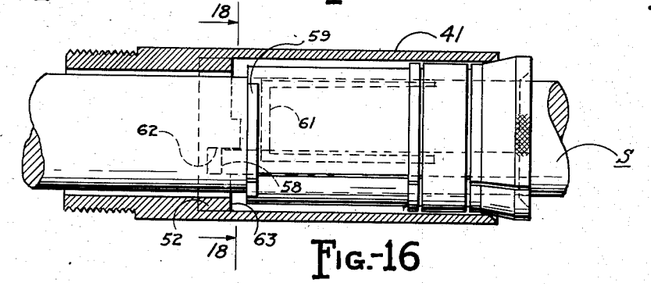
Figure 16 is a view of the assembled pusher with the shell in section and the bushing in elevation showing the wedging surfaces engaged to tightly grip the stock.
Figure 17:
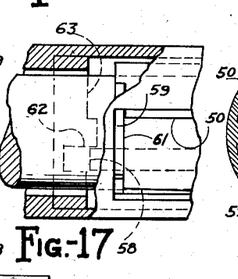
Figure 17 is a view corresponding to a portion of Figure 16 showing the position of the parts when the wedging surfaces are out of engagement.
Figure 18:
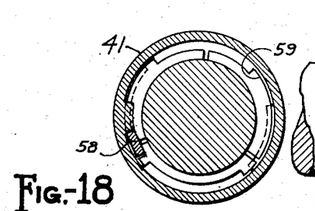
Figure 18 is a cross-section taken substantially on the line 18—18 of Figure 16.
Figure 19:
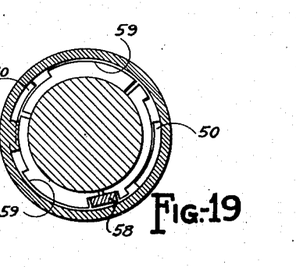
Figure 19 is a cross-section corresponding to Figure 18 but with the bushing turned through a sufficient angle to permit withdrawal of the bushing from the shell.
Figure 20:
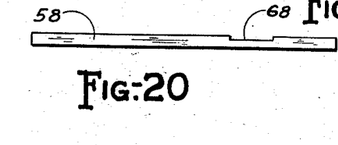
Figure 20 is a detailed view of a key embodied in the bushing shown in Figure 13.
Figures 21, 22:
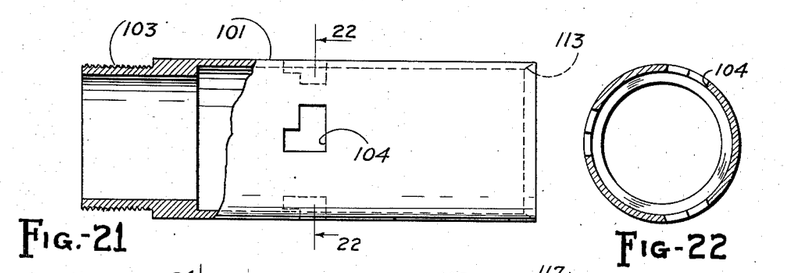
Figure 21 is a view partly in section and partly in elevation of a shell of a further modified form of the invention.
Figure 22 is a cross-section taken substantially on the line 22—22 of Figure 21.

The bushing 42 in this embodiment is cut into three separate pieces 54 by means of longitudinal cuts 55. At its forward end the bushing is provided with a thickened portion 56, the outer surface of which is bevelled at a small angle as indicated at 57. As in the previous embodiment the thickened portion 56 may conveniently be knurled to facilitate handling. Before cutting the slots 55, in the manufacture of the bushing, a groove 45 is milled into the bushing on one side through its full length. Conveniently, one of the slots 55 is cut through the bottom of the groove 45, as shown in Figures 14 and 15. A key 58 is seated in the groove 45 and is arranged to project rearwardly beyond the end of the bushing. The rear portion of the bushing is turned down from the full diameter, leaving abutment ribs 59 at the rearward end of the bushing, each of which may extend circumferentially for about 90° as illustrated in Figure 14.

The sleeve 52 in the shell 41 is formed with a notch 60 to receive the rear end of the key 58. When the key 58 is positioned in the notch 60 the abutment ribs 59 in the rear end of the bushing are positioned in alignment with the rear ends 61 of the prongs 50, so that the bushing 42 is prevented from escaping forwardly out of the shell by the engagement of the prongs against the ribs 59.

On one side of the notch 60 the sleeve 52 is provided with a lateral abutment 62 which is of sufficient length to prevent the key 58 from escaping between the sleeve 52 and the prongs 50 when the bushing is rotated in a direction to turn the key 58 towards the abutment 62. The abutment 62 may be of relatively short circumferential extent, and through the remainder of its circumference the sleeve 52 is formed with a forwardly facing abutment surface 63. The surface 63 is so located with respect to the ends 61 of the prongs 50 as to permit the end of the key 58 to be moved over the surface 63 with the ribs 59 in engagement with the prongs 50 when the bushing is rotated to turn the key away from the abutment 62. As illustrated the structure is arranged for use in a machine in which the spindle rotates in a clockwise direction as viewed from the rear end of the spindle, so that in normal use the end of the key 58 engages the lateral abutment surface 62 and prevents rotation of the bushing with respect to the shell.

The tapered surface 57 at the forward end of the bushing is arranged to cooperate with the bevelled surface 53 on the shell 41 so that when the key 58 is positioned in the notch 60 and the shell tends to move forwardly with respect to the bushing the outer end of the shell exerts a wedging force on the bushing to increase the grip of the bushing on the stock S. When the shell 41 is retracted or moved rearwardly the wedging grip is released and the bushing is pulled rearwardly over the stock by the engagement of the prongs 50 with the ribs 59.

In this embodiment the amount of wedging pressure that may be exerted on the stock is limited by the stiffness of the forward end of the shell 41, which is determined by the number and length of the slots 44. Preferably the shell is arranged to provide a substantial wedging grip upon the stock which will not permit slippage of the stock under any normal conditions, either from the force of starting the bar forwardly or the tendency of the bar to rebound when it strikes the stock gauge. However in the event that the piece previously being worked upon was not completely severed from the end, or if some other condition should prevent forward feeding of the bar by the pusher, the shell slips forwardly over the bushing, spreading the end of the shell, as permitted by the slots 44, until the rear end of the bushing seats against the forward face of the sleeve 52. When this occurs the bushing can be forced to slide forwardly over the stock against the friction provided by the spring grip of the bushing and the wedging action on the inclined surfaces 57. Such slipping may score and mar the bar, but relieves the mechanism so as to prevent breaking any part of the machine in the event forward feeding of the bar is prevented.

The sections 54 of the bushing 42 are provided with spaced aligned ribs 64 and 65, between which is located an annular spring 66. The spring 66 serves to hold the sections 54 of the bushing in the desired assembled relation and to provide a spring grip of the bushing upon the stock. The key 58 is formed with a notch 68 which receives and closely fits the spring 66 so that the spring also serves to lock the key 58 in the desired assembled position on the bushing.

In normal operation when the shell is retracted the ends 61 of the prongs 50 engage the abutment ribs 59 and draw the bushing rearwardly over the stock against the friction provided by the spring 66. As in the embodiment previously described this spring pressure is preferably of such magnitude as not to score or mar the stock and at the same time to provide sufficient resistance to give a good wedging action when the pusher shell moves forwardly.

When it is desired to withdraw the bar from this form of pusher it is only necessary to grasp the rear end of the bar, push it forwardly until the abutment ribs 59 are in full engagement with the ends 61 of the prongs 50, and rotate the bar in a counterclockwise direction so as to seat the rear end of the key 58 on the abutment surface 63 of the sleeve 52. In this position the bar can be withdrawn without causing engagement of the tapered surfaces 57 in the bevelled surface 53 of the shell, so that it is only necessary to overcome the friction of the spring grip of the bushing on the bar.

When it is desired to remove the bushing from the pusher shell to substitute a different size bushing, the forward enlarged end 56 of the bushing may be grasped and the bushing rotated further in the same direction until the abutment ribs move entirely past the ends 61 of the prongs 50, at which time the bushing 42 is free to be withdrawn forwardly out of the pusher shell. As in the embodiment previously described, the bushings may be removed and replaced from the front face of the collet without removing the pusher tube, when desired.

This form of my invention may also be arranged to permit withdrawal of the bar in a different manner, when desired. The resiliency given to the pusher shell by the slots 44, and the maximum permissible movement of the bushing in the shell before the rear end of the bushing or key strikes the collar 52, may be so correlated that the maximum gripping force exerted by the bushing is insufficient to score or mar the stock. The bar may then be removed by a straight rearward pull, or by slamming the bar and pusher tube rearwardly until the pusher tube strikes an abutment, such as the spider usually present in machines of this class. When the latter procedure is followed the momentum of the bar forces the tapered surface 57 to spread the forward end of the shell 41 until the rear end of the bushing 42 strikes the collar 52, and the remainder of the momentum slides the bar rearwardly through the bushing. This operation can be repeated until the entire bar has been removed from the pusher.

In this embodiment of the invention, the bushing has an initial constant gripping force on the bar provided by the spring 66, or by the inherent resilience of a one-piece bushing as disclosed in Figures 1 to 10, inclusive, or in any other desired manner. On the forward feeding stroke of the pusher, this gripping force is increased by the wedging of the tapered surface 57 in the bevelled surface 53 of the shell, the amount of such increased force being positively limited by the resilience of the shell, so that there is no danger of injury from an overload. When desired, the bar can be withdrawn against the friction provided by the spring grip plus the limited wedging grip.

A further modified form of my invention is illustrated in Figures 21 to 30, inclusive. In this form the pusher shell 101, as in the embodiments previously described, is provided at its rearward end with threads 103 to fasten the shell to the pusher tube, and is provided at its forward end with a bevelled surface 113. Intermediate its ends the shell is formed with one or more L-shaped cutouts 104 providing both forward and lateral abutment surfaces for cooperation with the bushing 102.

Figures 23, 25:
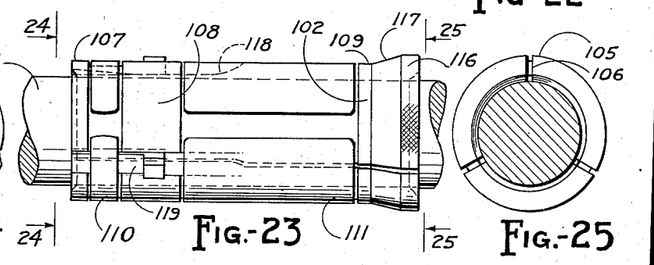
Figure 23 is a side elevation of a bushing to cooperate with the shell shown in Figure 21.
Figure 25 is a view of the opposite end looking in the direction of the arrows 25—25 of Figure 23.
Figure 24:
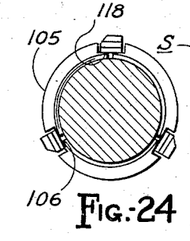
Figure 24 is an end view of the bushing looking in the direction of the arrows 24—24 of Figure 23.

As illustrated the bushing 102 is divided into three segmental portions 105 by longitudinal cuts 106. At its forward end the bushing is provided with a thickened portion 116, the outer surface of which is bevelled at a small angle as indicated at 117. The thickened portion 116 may be knurled to facilitate handling the same to remove the bushing.

The sections 105 of the bushing are preferably turned down at spaced points, leaving circumferential outwardly projecting ribs 107, 108, and 109. An annular spring 110 is seated between the ribs 107 and 108 and an annular spring 111 is seated between the ribs 108 and 109.

The bushing is provided with one or more milled slots 118 extending longitudinally and arranged to receive a key 119. As illustrated three slots 118 are provided and are located so that they are cut through by the slots 106 which divide the bushing into three parts.

Each key 119 is rockably seated in a slot 118 and is formed at one end with an extension 120 passing under the spring 110 and at the other end with an outwardly projecting head 121. The extension 120 is formed with a notch 122 receiving and fitting the spring 110, so that the keys are locked in their proper position by the spring.

Figure 26:
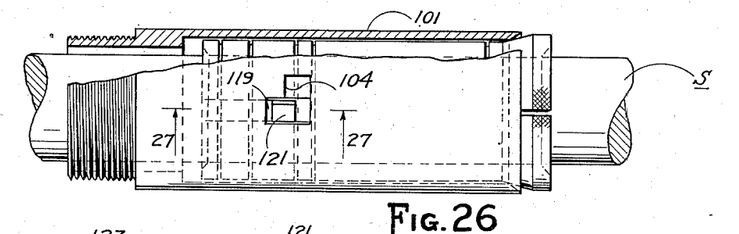
Figure 26 is a view partly in elevation and partly in section of the shell and bushing assembled with the wedging surfaces engaged to tightly grip the stock.
Figures 27, 28, 30:
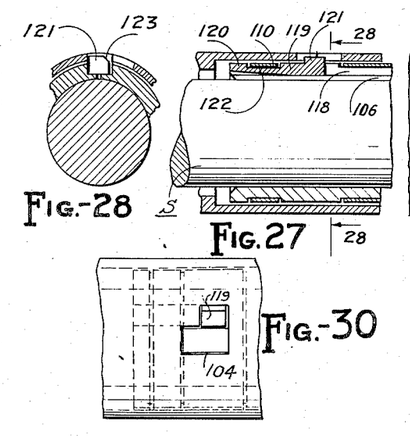
Figure 27 is a partial longitudinal section taken substantially on the line 27—27 on Figure 26 looking in the direction of the arrows.
Figure 28 is a cross-section taken substantially on the line 28—28 of Figure 27 looking in the direction of the arrows.
Figure 30 is a partial side elevation corresponding to Figure 29 but showing the bushing turned to prevent engagement of the wedging surfaces.
Figure 29:
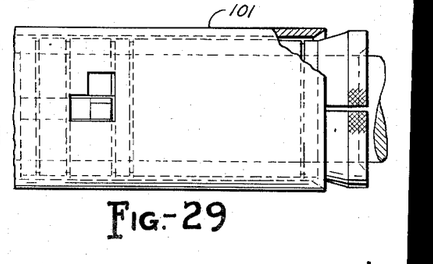
Figure 29 is a side elevation of the assembled pusher with a part of the shell broken away showing the wedging surfaces out of engagement.

The head 121 of each key 119 projects outwardly a slight amount beyond the outer surface of the bushing 102 and is positioned in one of the L-shaped cutouts 104 formed in the shell 101. The heads 121 of the keys 119 are normally positioned in the portion of the cutouts 104 having the greater axial length, as illustrated in Figure 26. In this position the keys 119 permit axial movement of the bushing with respect to the shell, and when the shell moves forwardly permit the tapered surfaces 117 to be wedged inwardly to tightly grip the stock by engagement with the bevelled surface 113 at the forward end of the shell. In normal operation the stock is rotated in a clockwise direction as seen from the rear end of the spindle, so that the head ends 121 of the keys remain in the portions of the cutouts 104 having the greater axial length and prevent relative rotation of the bushing and the shell. When it is desired to withdraw the bar from the pusher the bar is pushed forwardly and turned in a counterclockwise direction so as to seat the head ends 121 of the keys 119 in the portions of the cutouts 104 having the shorter axial length. In this position, as illustrated in Figure 30, the heads 121 prevent relative axial movement of the shell and bushing and thereby prevent wedging engagement of the tapered surfaces 117 and bevelled surface 113.

When the bar is removed from the pusher the sections 105 of the bushing collapse inwardly the amount permitted by the slots 106. This collapsing movement would be sufficient to permit the heads 121 of the keys 119 to escape from the cutouts 104 if the keys were rigidly mounted on the bushing. However, when the bushing collapses, the extensions 120 of the keys 119 are likewise pressed inwardly by the tension of the spring 110, forcing the heads 121 of the keys radially outward so that they remain engaged in the cutouts 104.

To permit removal of the bushing from the shell the head ends 121 of the keys are formed on one side with bevelled surfaces 123. When the stock is removed from the bushing the forward thickened portion of the bushing 116 may be grasped and the bushing rotated in the shell so as to turn the heads 121 into the short portions of the cutouts 104, and further rotated to engage the bevelled surfaces 123 with the edges of the cutouts 104 and force the head ends 121 of the keys radially inward against the tension of the spring 110. When this is done the keys clear the inner surface of the shell 101 and the bushing may be withdrawn from the shell.

In each of the modifications disclosed a master pusher is provided which has a relatively light grip on the stock during the rearward stroke, and a tight grip on the forward feeding stroke, and in which space is economized to such a point as to permit use of a bushing accommodating stock up to and including the maximum capacity of the machine. At the same time, in each modification means are provided to permit the withdrawal of the stock from the rear of the machine when desired without applying the tight or wedging grip, and means are provided to facilitate the removal and replacement of the bushing from the pusher shell. Space is economized, permitting the pusher to accommodate stock to the maximum capacity, by disposing both the wedging surfaces and the abutments for limiting relative movement of the shell and bushing within the combined thickness of the walls of the shell and of the bushing.

Although various features have been described and illustrated in connection with each of the embodiments, it is to be understood that the invention in its broader aspects is not limited to any of the particular forms disclosed or to any combination of the particular features which are illustrated in the different embodiments. For example, in any of the forms the bushing may be a one-piece resilient member, as illustrated in Figures 1 to 10, or may be formed as separate segments held assembled by springs or any other suitable means as illustrated in Figures 11 to 30. Likewise when desired these two different forms of bushing may be used in the same shell. For example, the bushings to fit the smaller sizes of stock to be handled in the machine may be formed of separate segments, and the bushings to receive the larger sizes of stock may be one-piece bushings. Similarly the arrangement of the shell to relieve the wedging pressure in the event of overload as illustrated in Figures 11 to 20, inclusive, may be used in either of the other two embodiments. Many other modifications and variations in the arrangement may be resorted to without departing from the scope of the invention as defined in the following claims.

I claim:

1. In a pusher for automatic screw machines and the like, a pusher shell, a bushing within the shell arranged to surround the stock to be fed, the forward end of said bushing projecting beyond said shell and having wedging surfaces tapering from the outside diameter of the bushing to about the outside diameter of said shell, and an abutment on the shell cooperating with the rear end of the bushing, said abutment projecting inwardly from the inner surface of the shell but not beyond the inside diameter of the bushing, said abutment in the normal angular relation of the bushing and shell, being spaced from the bushing in an axial direction to permit wedging engagement of said wedging surfaces with the forward end of said shell, and, in a different angular relation of the bushing and shell, being arranged to engage a portion of said bushing and prevent such wedging engagement.

2. In a pusher for automatic screw machines and the like, a pusher shell, a bushing within the shell resiliently contracting upon the stock to be fed, the forward end of the bushing extending out of said shell and having a tapered surface increasing to a diameter greater than the inside diameter of said shell, the forward edge of said shell being arranged to engage said tapered surface and wedge said bushing inwardly upon the stock to be fed when said shell is moved forwardly, and cooperating abutments on said shell and said bushing positioned rearwardly of said forward edge of said shell and arranged to engage each other and slide said bushing over the stock against the friction provided by the resilient grip of the bushing on the stock when said shell is moved rearwardly.

3. In a pusher for automatic screw machines and the like, a pusher shell, a bushing within the shell, the forward end of the bushing extending out of said shell and having a tapered surface increasing to a diameter greater than the inside diameter of said shell, the forward edge of said shell being arranged to engage said tapered surface and wedge said bushing inwardly upon the stock to be fed when said shell is moved forwardly, and cooperating abutments on said shell and said bushing positioned rearwardly of said forward edge of said shell and arranged, in the normal angular relation of said bushing and shell, to engage and slide said bushing over the stock when said shell is moved rearwardly, said abutments, in a different angular relation of said bushing and shell, being arranged to clear each other to permit said bushing to be removed from said shell.

4. In a pusher for automatic screw machines and the like, a pusher shell, a bushing within the shell, the forward end of the bushing extending out of said shell and having a tapered surface increasing to a diameter greater than the inside diameter of said shell, the forward edge of said shell being arranged to engage said tapered surface and wedge said bushing inwardly upon the stock to be fed when said shell is moved forwardly, cooperating abutments on said shell and said bushing positioned rearwardly of said forward edge of said shell and arranged, in the normal angular relation of the bushing and shell, to engage and slide said bushing over the stock when said shell is moved rearwardly, said abutments, in a different angular relation of said bushing and shell, being arranged to clear each other to permit said bushing to be removed from said shell, and cooperating means on said shell and bushing normally restraining relative rotation of said shell and bushing.

5. In an automatic machine having a spindle arranged to grip and rotate stock in a clockwise direction, stock feeding mechanism including a pusher shell, a bushing within the shell surrounding the stock to be fed, cooperating wedging surfaces on the bushing and shell arranged to engage each other and force said bushing inwardly upon the stock to be fed when said shell is moved forwardly, pull-back abutments on said shell and said bushing arranged, in the normal angular relation of the bushing and shell, to engage and slide said bushing over the stock when said shell is moved rearwardly, lateral abutments on the shell and bushing engaging each other in the normal angular relation to prevent rotation of said bushing in a clockwise direction with respect to said shell, means in said shell arranged to engage said bushing when the latter is rotated counterclockwise through a predetermined angle with respect to the shell to prevent engagement of said wedging surfaces, said pull-back abutments being arranged to clear each other to permit removal of said bushing when the same is rotated counterclockwise through a further angle with respect to said shell.

6. In an automatic machine having a spindle arranged to grip and rotate stock in a clockwise direction, stock feeding mechanism including a pusher shell, a bushing within the shell arranged to surround and resiliently grip the stock to be fed, cooperating wedging surfaces on the bushing and shell arranged to engage each other and increase the grip of the bushing on the stock when said shell is moved forwardly, pull-back abutments on the shell and bushing arranged, in the normal angular relation of the bushing and shell, to engage each other and slide the bushing over the stock against the friction of the resilient grip of the bushing when said shell is moved rearwardly, lateral abutments on the shell and bushing engaging each other in the normal angular relation to prevent rotation of said bushing in a clockwise direction with respect to said shell, means in said shell arranged to engage said bushing when the latter is rotated counterclockwise through a predetermined angle with respect to the shell to prevent engagement of said wedging surfaces, said pull-back abutments being arranged to clear each other to permit removal of said bushing when the same is rotated counterclockwise through a further angle with respect to said shell.

7. In a stock feeding mechanism, a pusher shell, a bushing within the shell, cooperating abutments on the shell and bushing to limit axial movement of the bushing relative to the shell in one direction, said abutments being in engagement in one angular relation of the bushing and shell and out of engagement in another angular relation, means normally operative to restrict relative rotation of the bushing and shell to hold said abutments in engagement, said means being yieldable upon the application of an excess turning force in one direction to permit said abutments to be turned out of engagement for removal of the bushing from the shell.

8. In a stock feeding mechanism, a pusher shell, a bushing within the shell, cooperating abutments on the shell and bushing to limit axial movement of the bushing relative to the shell in one direction, cooperating wedging surfaces on the bushing and shell arranged to engage each other and force said bushing inwardly upon the stock to be fed upon axial movement of the bushing relative to the shell in the other direction, said abutments being in engagement in one angular relation of the bushing and shell and out of engagement in another angular relation, means normally operative to restrict relative rotation of the bushing and shell to hold said abutments in engagement, said means being yieldable upon the application of an excess turning force in one direction to permit said abutments to be turned out of engagement for removal of the bushing from the shell.

9. In a stock feeding mechanism, a pusher shell, a bushing within the shell surrounding the stock to be fed, cooperating abutments on the shell and bushing to limit axial movement of the bushing relative to the shell in one direction, cooperating wedging surfaces on the bushing and shell arranged to engage each other upon axial movement of the bushing relative to the shell in the other direction, said abutments being in engagement in the normal angular relation of the bushing and shell and out of engagement in another angular relation, means on the bushing and shell engageable at an intermediate angular relation of the bushing and shell to prevent engagement of said wedging surfaces with each other, means normally operative to restrict relative rotation of the bushing and shell past said intermediate angular relation, said means being yieldable upon the application of an excess turning force in one direction to permit said abutments to be turned out of engagement for removal of the bushing from the shell.

10. In a stock feeding mechanism, a pusher shell, a bushing within the shell, cooperating abutments on the shell and bushing to limit axial movement of the bushing relative to the shell in one direction, said abutments being in engagement in one angular relation of the bushing and shell and out of engagement in another angular relation, a key rockably mounted on said bushing having a head normally positioned in an opening in said shell, to restrict relative rotation of the bushing and shell so as to hold said abutments in engagement, spring means urging the head of said key into the opening in the shell, said key head having a bevelled surface engageable with a wall of the opening in said shell to force said head inwardly upon the application of an excess turning force in one direction to permit said abutments to be turned out of engagement for removal of the bushing from the shell.

11. In a pusher for automatic screw machines and the like, a pusher shell, a resiliently expandible bushing within the shell arranged to surround and resiliently grip the stock to be fed, means to limit relative axial movement of the bushing and shell, said shell having inwardly directed spring fingers engaging said bushing and increasing the resilient grip of the same upon the stock.

12. In a pusher for automatic screw machines and the like, a pusher shell, a bushing within the shell, cooperating wedging surfaces on the bushing and shell arranged to engage each other and force said bushing inwardly upon the stock to be fed when said shell is moved forwardly, said shell having inwardly directed spring fingers engaging said bushing and resiliently pressing the same inwardly upon the stock.

13. In a pusher for automatic screw machines and the like, a pusher shell, a bushing within the shell, cooperating wedging surfaces on the bushing and shell arranged to engage and force said bushing inwardly upon the stock to be fed when said shell is moved forwardly, said shell having inwardly directed spring fingers engaging said bushing and pressing the same inwardly upon the stock, and said bushing having shoulders engaging the ends of said spring fingers when said shell is moved rearwardly.

14. In a pusher for automatic screw machines and the like, a pusher shell, a bushing within the shell, a wedging surface on the bushing arranged to engage an end edge of said shell and force said bushing inwardly on the stock to be fed when the shell is moved forwardly, cooperating abutments on the shell and bushing positioned rearwardly of said wedging surface and arranged to limit forward movement of the shell relative to the bushing, said shell being slotted to render said end edge thereon resiliently yieldable circumferentially to limit the maximum wedging force that can be exerted upon the stock.

15. In a pusher for automatic screw machines and the like, a pusher shell, a bushing within the shell surrounding and resiliently gripping the stock to be fed, the forward end of said bushing projecting out of said shell and having a tapered surface increasing to a diameter greater than the inside diameter of said shell, the forward surface of said shell being arranged to engage said tapered surface to wedge said bushing inwardly on the stock to be fed when the shell is moved forwardly, cooperating abutments on the shell and bushing positioned rearwardly of said forward surface of said shell to limit forward movement of the shell relative to the bushing, one of said surfaces being resiliently yieldable to limit the maximum wedging force that can be exerted upon the stock.

16. In a pusher for automatic screw machines and the like, a pusher shell, a bushing within the shell surrounding and resiliently gripping the stock to be fed the forward end of said bushing projecting out of said shell and having a tapered surface increasing to a diameter greater than the inside diameter of said shell, the forward edge of said shell being arranged to engage said tapered surface to wedge said bushing inwardly on the stock to be fed when the shell is moved forwardly, cooperating abutments on the shell and bushing positioned rearwardly of said forward edge of said shell to limit forward movement of the shell relative to the bushing, said shell having one or more slots extending axially inward from its forward edge rendering the same resiliently expansible to limit the maximum wedging force that can be exerted upon the stock.

17. In a pusher for automatic screw machines and the like, a pusher shell, a bushing within the shell arranged to surround the stock to be fed, the forward end of said bushing projecting beyond said shell and having wedging surfaces tapering from the outside diameter of the bushing to about the outside diameter of said shell, said shell having inwardly directed spring fingers engaging said bushing, portions of said fingers forming abutments, and shoulders on said bushing engaging said abutments to limit axial movement of said shell rearwardly with respect to said bushing.

18. In a pusher for automatic screw machines and the like, a pusher shell, a bushing within the shell arranged to surround the stock to be fed, the forward end of said bushing projecting beyond said shell and having wedging surfaces tapering from the outside diameter of the bushing to about the outside diameter of said shell, an abutment on the shell cooperating with the rear end of the bushing, said abutment projecting inwardly from the inner surface of the shell but not beyond the inside diameter of the bushing, and fingers struck inwardly from said shell engageable with forwardly facing shoulders formed withing the wall thickness of said bushing.

19. In a pusher for automatic screw machines and the like, a pusher shell, a bushing within the shell resiliently contracting upon the stock to be fed, the forward end of the bushing having a tapered surface increasing to a diameter greater than the inside diameter of said shell, said shell having a cooperating surface arranged to engage said tapered surface and wedge said bushing inwardly upon the stock to be fed when said shell is moved forwardly and cooperating abutments on said shell and said bushing disposed rearwardly of said tapered surface arranged to engage each other and slide said bushing over the stock when said shell is moved rearwardly.

20. In a pusher for automatic screw machines and the like, a pusher shell having its forward edge circumferentially continuous, a bushing within the shell resiliently contracting upon the stock to be fed, the forward end of the bushing having a tapered surface increasing to a diameter greater than the inside diameter of said shell, said shell having a cooperating surface arranged to engage said tapered surface and wedge said bushing inwardly upon the stock to be fed when said shell is moved forwardly and cooperating abutments on said shell and said bushing disposed rearwardly of said tapered surface arranged to engage each other and slide said bushing over the stock when said shell is moved rearwardly.

21. In a pusher for automatic screw machines and the like, a pusher shell having its forward edge circumferentially continuous, a one piece bushing within the shell, said bushing being formed with longitudinally extending slots with the separated portions thereof stressed inwardly to resiliently contract upon the stock to be fed, the forward end of the bushing having a tapered surface increasing to a diameter greater than the inside diameter of said shell, said shell having a cooperating surface arranged to engage said tapered surface and wedge said bushing inwardly upon the stock to be fed when said shell is moved forwardly and cooperating abutments on said shell and said bushing disposed rearwardly of said tapered surface arranged to engage each other and slide said bushing over the stock when said shell is moved rearwardly.

22. In a pusher for automatic screw machines and the like, a pusher shell, a one piece bushing within the shell, said bushing being formed with longitudinally extending slots with the separated portions thereof stressed inwardly to resiliently contract upon the stock to be fed, the forward end of the bushing having a tapered surface increasing to a diameter greater than the inside diameter of said shell, said shell having a cooperating surface arranged to engage said tapered surface and wedge said bushing inwardly upon the stock to be fed when said shell is moved forwardly and cooperating abutments on said shell and said bushing disposed rearwardly of said tapered surface arranged to engage each other and slide said bushing over the stock when said shell is moved rearwardly.

STODDARD B. MARTIN.